United States Patent [19]

Kishi et al.

[11] Patent Number: 5,135,765
[45] Date of Patent: Aug. 4, 1992

[54] PROCESS FOR PRODUCING PROTEIN-RICH PRODUCT, FIBROUS PRODUCT AND/OR VEGETABLE OIL FROM BREWER'S SPENT GRAIN

[75] Inventors: Sohtaroh Kishi, Kashiwa; Takashi Kimura, Yokohama; Takeshi Minami, Kawasaki; Haruto Kobayashi, Yokohama, all of Japan

[73] Assignees: Kirin Beer Kabushiki Kaisha; Chiyoda Corporation, both of Japan

[21] Appl. No.: 437,639

[22] Filed: Nov. 16, 1989

[30] Foreign Application Priority Data

Nov. 18, 1988 [JP] Japan .................. 63-291241

[51] Int. Cl.⁵ ............................................ A23L 1/10
[52] U.S. Cl. ............................. 426/417; 426/436; 426/478; 426/482; 426/481; 426/624; 426/656
[58] Field of Search ............... 426/417, 31, 479, 481, 426/478, 482, 429, 624, 656, 436

[56] References Cited

U.S. PATENT DOCUMENTS 4,171,383 10/1979 Chwalek et al. .............. 426/623
4,464,402 8/1984 Gannon ........................ 426/242

FOREIGN PATENT DOCUMENTS 370451 8/1988 Fed. Rep. of Germany .
51-129776 11/1976 Japan .

OTHER PUBLICATIONS

Finley et al "Milling and Baking Properties of Dried Brewer's Spent Grains", Cereal Chemistry 57(3), pp. 166–168, 1980.

Primary Examiner—Joseph Golian
Assistant Examiner—Evan Federman
Attorney, Agent, or Firm—Lorusso & Loud

[57] ABSTRACT

A process for producing a protein-rich product and/or a fibrous product is disclosed which includes the steps of pressing brewer's spent grain (BSG) in a wet state, and sieving the resulting pressed BSG in the presence of water to thereby separate it into a protein-containing fraction and a fibrous fraction.

19 Claims, No Drawings

PROCESS FOR PRODUCING PROTEIN-RICH PRODUCT, FIBROUS PRODUCT AND/OR VEGETABLE OIL FROM BREWER'S SPENT GRAIN

This invention relates to a process for producing a protein-rich product, a fibrous product and/or a vegetable oil from brewer's spent grain (hereinafter referred to as BSG). The protein-rich product obtained by the present invention is suited as feed for farm animals and cultured fish, and is expected to find application as food material such as starting material for a seasoning.

As a vegetable, protein-rich product, soybean and defatted soybean are most widely used. However, soybean-producing districts are localized in the world, and a problem of short supply of soybean can arise on account of unseasonable weather. In addition, soybean supply in Japan almost completely depends upon import, with the import price varying depending upon various factors. Hence, protein-rich resources other than soybean,, which can be supplied stably at a low price, are needed.

On the other hand, since BSG, which is a by-product produced in producing beer, contains protein in an amount of as low as about 25% based on dry weight, its use has been limited in the past to cattle feed. Accordingly, it has been desired to separate a protein-rich product from BSG for new uses.

In order to increase a protein content, attempts have been made to mill and sieve dry BSG (U.S. Pat. Nos. 4,377,601 and 4,547,382). In this process, husks become so fire in the grinding step that separation thereof from a protein-containing fraction becomes difficult, and the protein content of the resulting product is still as low as 30 to 40wt % based on dry weight, and thus the product is still insufficient as a protein resource. In addition, the process has another defect in that, since raw BSG contains water, a large amount of heat energy is required for drying it. Hence, it is desired to develop a process which provides a protein-rich product containing proteins in an amount equal to or more than that of soybean (containing about 40% of proteins) or a defatted, protein-rich product containing proteins in an amount equal to or more than that of defatted soybean (containing about 50% of proteins).

Japanese Unexamined Patent publication No. 51-129776 discloses a process of extracting BSG using an alkaline aqueous solution of 11-12 in pH at a temperature of 220° F.-250° F. (104° C. -121° C.), then precipitating a protein-rich product from the thus-obtained extract by isoelectric precipitation. This process, however, involves decomposition of proteins due to the severe, high-temperature extraction condition, resulting in a decreased yield of proteins and deteriorated quality of the product. In addition, this process requires a large heat energy for extraction at an elevated temperature. Further, in actual practice, the alkaline aqueous solution must be added to the BSG to an increase in temperature of the system, and thus the extraction procedure becomes complicated. Still further, the protein-rich product obtained by this process does not contain the lipid of the BSG, with the lipid, important as feed for farm animals and fish being wasted.

SUMMARY OF THE INVENTION

It has now been found that a protein-rich product can be inexpensively obtained by pressing BSG in a wet state so as to separate ground or crushed germs and other particles from husks and then sieving the pressed BSG in the presence of water. The present inventors have also found that a protein-containing coarse particulate product having a low protein content can be converted to a protein-rich product by subjecting it to an alkali extraction under mild conditions.

There is provided in accordance with the present invention a process for obtaining a protein-rich product and/or a fibrous product which comprises pressing BSG in a wet state to separate from husks ground germs and other particles, and sieving the pressed BSG in the presence of water to separate out a protein-containing product.

In another aspect, the present invention provides a process for obtaining a protein-rich product which comprises pressing BSG in a wet state to separate from husks ground germs and other particles, sieving the pressed BSG in the presence of water, extracting a protein-containing coarse particulate fraction obtained by the above sieving treatment with a 0.05 N–0.15 N aqueous alkaline solution at a temperature of 60° to 100° C. for 10 to 40 minutes.

The present invention further provides a process for producing a vegetable oil and a defatted, protein-rich product, which comprises extracting the protein-rich product obtained by the above-mentioned process with a solvent.

DESCRIPTION OF THE PREFERRED EMBODIMENTS

These processes are described in detail below.

BSG is a saccharification residue of brewer's malt (optionally containing rice, corn grits, corn starch, etc. as secondary starting materials) produced as a by-product in production of beer. Usually, the BSG, which is separated from wort in a wet state by means of a solid-liquid separator such as a lauter tub or a mash filter, has a water content of about 80 wt % and contains about 25 wt % of proteins on dry basis. In the present invention, BSG with a water content of about 70-80 wt % separated from the wort may be used as such, or may be dewatered or moistened before use. Or, dried BSG may be moistened to be adapted for use as the starting material.

The process of the present invention involves the step of pressing BSG in a wet state. The BSG is constituted by husks, germs and other particles, and their contents of proteins are about 5 wt %, about 50 wt % and about 50 wt %, respectively. The germs and other particles having a high protein content are bound or stuck to the husks as vegetable tissues. Therefore, a protein-rich product can be obtained by removing husks from the BSG.

The inventors' investigation has revealed that, when BSG is pressed in a wet state, germs and other particles having a high protein content are separated from husks and, at the same time, the separated germs and the particles are ground, with the husks remaining substantially non-ground and that the thus-obtained pressed BSG can be effectively separated into a protein-containing product and a fibrous (husk) product by sieving the pressed BSG in the presence of water.

As the pressing apparatus to be used in the present invention any grinder with a structure suitable for giving a the material to be treated may be used. The use of a roll mill is particularly preferred. In the pressing treatment using a roll mill, BSG in a wet state is pressed and partly ground by the pressing force between the rolls to thereby separate from the husks protein-rich germs and particles which have been bound or stuck thereto with the simultaneous grinding of the germs and particles. The gap between rolls is 0.05 to 2 mm, preferably 0.1 to 0.3 mm. In the pressing of BSG, it suffices the BSG to have a water content sufficient to prevent fine grinding of the husks, with a water content equal to or greater than 65 wt % being particularly preferable. If the water content is too low, part of the husks will be ground to fine particles, which makes it difficult to separate the pressed BSG into husks and a protein-containing product by sieving.

Additionally, in BSG before being processed exists, to some extent, a fine particulate protein-containing product in a state separate from the husks. It is, therefore, possible to preliminarily sieve such BSG prior to the pressing treatment to thereby separate and recover the fine particulate, protein-containing product. The sieve to be used in this preliminary sieving is of 20 to 50 mesh, preferably 30 to 35 mesh. This sieving treatment is conducted preferably in the presence of water.

In the present invention, the pressed BSG obtained as mentioned hereinbefore is then sieved in the presence of water to separate same into a fibrous fraction comprising husks are a fraction of protein-containing product. Suitable techniques for sieving the pressed BSG in the presence of water, include, for example, a sieving technique wherein BSG is sieved using a submerged sieve, a sieving technique wherein previously watered BSG is fed to sieving apparatus, and a sieving technique wherein BSG is sieved with a sieving apparatus while supplying or spraying water thereto. As the sieving apparatus, a vibrating screen is preferably used.

In the sieving treatment, a fraction of a fibrous product (size: 1-5 ,mm,) composed of husks can be obtained as a plus fraction. For this purpose, sieve opening is of 5-20 mesh, preferably 10-15 mesh. On the other hand, the fraction passing through this sieve includes a fraction of fine particles having a high protein content and coarse particles having a lower protein content than the fine particles. In order to separate the former fraction of more protein-rich product (fraction of fine particles), further sieving is conducted using a sieve of 20-50 mesh, preferably 30-35 mesh. In this sieving treatment, the coarse particles product is retained on the sieve, whereas the fine particles product is permitted to pass through the sieve.

The sieving treatment employed in the present invention is not particularly limited as to the number of times of sieving, order of sieving treatments, or other conditions, which may be varied and properly selected in consideration of clogging of sieve opening, etc. In the present invention, the aforesaid pressing treatment and the sieving treatment are preferably repeated several times (2 to 5 times) for the purpose of effectively separating and recovering the fraction of protein-rich product (fraction of fine particles). For example, a fraction of fibrous product is separated from the pressed BSG by first sieving, the remaining fraction is again sieved by second sieving to thereby separate it into a fraction of coarse particles and a fraction of fine particles, the fraction of coarse particles is again pressed, and the thus-obtained pressed coarse particles are sieved into a fraction of fine particles and a fraction of coarse particles.

The combination of pressing treatment and sieving treatment described above enables one to obtain a fine particulate protein-rich product (fraction of fine particles) having a protein content of 40 wt % or more (based on dry weight), a protein-containing product (fraction cf coarse particles) having a protein content of about 25 wt % ((based on dry weight), and a fibrous product composed of husks. The thus-obtained fine particulate protein-rich product can be used as such or after drying or other treatment, as material for feed or food. For some uses the product is advantageously defatted to produce a defatted protein-rich product. On the other hand, the coarse particulate protein-containing product can be utilized as feed for cattle as is with conventional BSG, or may preferably be subjected to an alkali-extracting treatment to be described hereinafter to separate and recorder a protein-rich product therefrom. The fibrous product composed of husks can be effectively utilized as feed or fuel, and the combustion ash thereof can be utilized as fertilizer or ceramic material.

The alkali extraction of the coarse particulate protein-containing product (fraction of coarse particles) obtained as described above is conducted by adding a 0.05 N–0.15 N alkaline aqueous solution to the coarse particulate protein-containing product and conducting extraction under the conditions of 60°–100° C., preferably 70°–90° C., in temperature and 10–40 minutes, preferably 15–35 minutes, in extracting period. As the alkali for preparing the alkaline aqueous solution, sodium hydroxide, potassium hydroxide, calcium hydroxide, etc. are usually used.

After the aforesaid extraction using the alkaline aqueous solution, a protein-rich product is precipitated and recovered. For example, an acid is added to the extract immediately after the extraction treatment to adjust the pH to 7-11, an extraction residue is removed from the extract, and an acid is further added to the thus-obtained extract to adjust the pH to 2 to 5, preferably to an isoelectric point of 3 to 4 to thereby precipitate a protein-rich product, and this precipitate is separated and recovered by a solid-liquid separation method. As the solid-liquid separation method, a conventional method such as centrifugal separation, filtration separation, etc. may be employed. The thus-obtained product has a protein content of about 50 wt % or above and a lipid content of about 15 wt % or above.

In the extraction treatment in accordance with the present invention, a comparatively low extracting temperature of 60° to 100° C. and a short extracting time of 10 to 40 minutes are employed. Employment of such conditions serves to avoid decomposition of the extracted protein-rich product. After completion of the alkali extraction treatment, an acid may immediately be added, if necessary, to the extract to reduce its pH to 7-11 to thereby inhibit decomposition of protein by the alkali. A protein-rich product may be obtained by suppressing decomposition of proteins as described above. This protein-rich product may be utilized as feed or the like in an as-produced form or after treatment such as defatting treatment or drying.

All of the thus-obtained protein-rich products contain lipid but, for some uses, they are advantageously converted defatted products. For such uses, the protein-rich product is extracted with a solvent in a wet state or in a state of being dried at low temperatures (30°-100° C.) to recover lipid (vegetable oil), followed by removal of the solvent. The suitable solvents for this purpose include paraffins such as n-hexane, alcohols such as ethanol, supercritical carbon dioxide, etc. The solvent-removing treatment may be conducted by heating the extract residue to a temperature equal to or above the boiling point of the solvent under ambient or reduced pressure, or by a reduced pressure procedure. Further, removal of the solvent from the extract enables lipid (vegetable oil) to be recovered.

This invention provides a protein-rich product, a fibrous product and vegetable oil with an enhanced value effectively and inexpensively from BSG. The protein-rich product can be advantageously utilized as feed for farm animals or cultured fish or as material for food such as seasoning material as is the case with conventional soybean protein.

The present invention is now described in more detail by reference to the following Examples.

EXAMPLE 1

About 10 kg of water was added to 3 kg (dry weight: 672 g) of BSG in a wet state (water content: 77.6 wt %), and the resulting mixture was subjected to preliminary sieving in water using a 35-mesh sieve. The fraction of fine particulate protein-containing product which passed through the sieve was dewatered by centrifugation for recovery as a slurry. The plus fraction of coarse particulate protein-containing product was pressed by means of a roll mill (roll-rotating rate: 100 rpm; roll-to-roll gap: 0.1 mm) to thereby separate particles bound or stuck to the husks from the husks and to concurrently grind the particles. Then, this roll mill-treated product was sieved using a 35-mesh sieve to recover a fraction of fine particulate protein-containing produce. Again, the plus fraction of coarse particulate protein-containing product was subjected to roll mill treatment and sieving treatment in the same manner to recover a fraction of fine particulate protein-containing product. Once again, the plus fraction of coarse particulate protein-containing product was sieved in water using a 10-mesh sieve to recover 160 g by dry weight of a fibrous product as a fraction composed of only husks remaining on the sieve.

The fine particulate protein-containing product recovered as a slurry in the above-described manner was vacuum dried to obtain 180 g of a dry product. This fine particulate protein-containing product was a protein-rich product having a protein content of 50.8 wt % based on dry weight.

EXAMPLE 2

500 ml of ethanol was added to 100 g of the protein-rich product obtained in Example 1, followed by extraction treatment at 30° C. for 1 hour. This extraction treatment yielded 83.0 g of defatted protein-rich product (dry product) and 17.0 g of a vegetable oil, with the protein content in the defatted protein-rich product being 62.0% based on dry weight.

EXAMPLE 3

About 30 liters of water was added to 10 kg (dry weight: 2.24 kg) of BSG in a wet state (water content: 77.6 wt %), and the resulting mixture was subjected to preliminary sieving in water using a 35-mesh sieve. A fraction of fine particulate protein-containing product which passed through the sieve was dewatered by centrifugation and recovered as a slurry. The plus fraction of coarse particulate protein-containing product remaining on the sieve was pressed by means of a roll mill (roll-rotating rate: 100 rpm; roll-to-roll gap: 0.3 mm) to thereby separate particles bound or stuck to the husks from the husks and to concurrently grind the particles.

Then, this roll mill-treated product was sieved using a 10-mesh sieve to recover a fraction of fibrous product composed of only husks remaining on the sieve, and a fraction of fine particulate and coarse particulate protein-containing product which passed through the sieve. Then, this minus fraction was fraction in water using a 35-mesh sieve to recover a coarse particulate protein-containing product as a plus sieve and a fine particulate protein-containing product as a minus fraction.

The dry weight of the thus recovered fraction of fine particulate protein-containing product was 522 g, with its protein content being 51.49% based on dry weight and the protein-recovery ratio being 47.2%.

On the other hand, the weight (dry weight) of the fraction of the coarse particulate protein-containing product obtained above was 943 g, with its protein content being 25.9 wt %.

Then, 500 ml of water was added to 100 g (in a wet state) of the fraction of coarse particulate protein-containing product, followed by further adding a 2N NaOH aqueous solution to prepare a 0.1 N alkaline aqueous solution as a whole. After stirring the solution at 85% for 30 minutes, an extraction residue was removed by centrifugation, and the resulting extract was adjusted to 4.5 in pH with 2N hydrochloric acid. This pH adjustment gave a precipitate, and this precipitate was recovered by centrifugation. The dry weight of this precipitate was 19.0 g, with its protein content being 58.6 wt % and the protein-recovery ratio from the fraction of coarse particulate protein-containing product being 42.9 wt %.

As is described above, 72.2% of proteins can be recovered from BSG by combining the pressing treatment and the alkali extraction treatment.

EXAMPLE 4

The relationship between alkali concentration, extracting period and protein-recovery ratio in the case of conducting extraction by adding 1 liter of a NaOH aqueous solution to 100 g (water content: 75 wt %) of the coarse particulate protein-containing product obtained in Example 3 is tabulated in Table 1.

TABLE 1

| Alkali concentration (N) | Protein-recovery Ratio (wt %) Extracting Period (min.) | | | | |
|---|---|---|---|---|---|
| | 15 | 30 | 45 | 60 | 120 |
| 0.04 | 42.1 | 41.9 | 38.4 | 41.3 | 39.1 |
| 0.10 | 44.0 | 50.5 | 33.7 | 31.3 | 28.1 |
| 0.20 | 34.6 | 26.8 | 24.9 | 17.8 | 15.6 |
| 0.40 | 7.64 | 6.13 | 5.19 | 5.23 | 2.18 |

EXAMPLE 5

The relationship between temperature, alkali concentration, extracting period and protein-recovery ratio and protein content in the case of conducting extraction for 30 minutes by adding 1 liter of a 0.1 N NaOH aqueous solution to 100 g (water content: 75 wt %) of the coarse particulate protein-containing product obtained in Example 3 is tabulated in Table 2.

TABLE 2

| Extracting Temp. (°C.) | 50 | 70 | 90 | 100 | 120 |
|---|---|---|---|---|---|
| Protein-recovering Ratio (%) | 27.2 | 44.1 | 48.4 | 55.3 | 35.0 |
| Protein Content (%) | 60.2 | 59.8 | 58.6 | 46.6 | 46.1 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for producing a protein-rich product and a fibrous product from brewer's spent grain containing germ, husks and a proteinaceous material adhering to the husks, said process comprising:

providing a wet brewer's spent grain having a water content of at least 65% by weight;

passing said wet brewer's spent grain through a roll mill to press said brewer's spent grain with simultaneous grinding of the germ and the proteinaceous material, thereby separating said germ and proteinaceous material from said husks; and sieving the brewer's spent grain in water, using a screen of 20-50 mesh, after passage through the roll mill to obtain a protein-rich product, containing the germ and at least 50% proteinaceous material, as a minus fraction and the husks as a plus fraction.

2. A process as set forth in claim 1, additionally comprising extracting said protein-rich product with a solvent, to thereby separate said protein-rich product into a defatted protein and a vegetable oil.

3. A process as set forth in claim 1 further comprising sieving said brewer's spent grain prior to said passage through said roll mill to separate and recover a fine particulate, protein-enriched fraction and subjecting the remainder of said brewer's spent grain to said pressing.

4. A process as set forth in claim 1 wherein said plus fraction has a particle size of 1-5 mm.

5. A process as set forth in claim 1 wherein said sieving utilizes a screen of 10-15 mesh.

6. A process as set forth in claim 1 wherein said roll mill has a roll gap of 0.05 to 2.0 mm.

7. A process as set forth in claim 1 wherein said sieving comprises supplying the pressed brewer's spent grain and water to a sieving apparatus.

8. A process as set forth in claim 7 wherein said water is supplied in the form of a spray.

9. A process as set forth in claim 7 wherein the pressed brewer's spent grain is watered and then fed to the sieving apparatus.

10. A process as set forth in claim 1 wherein said sieving comprises supplying the pressed brewer's spent grain to a sieving apparatus submerged in water.

11. A process as set forth in claim 7 wherein the sieving apparatus is a vibrating filter.

12. A process as set forth in claim 1, wherein prior to said sieving with said screen of 20-50 mesh, the brewer's spent grain after passage through the roll mill is sieved with a screen of 5-20 mesh to obtain the husks as a plus fraction and a protein-containing fraction as a minus fraction, said protein-containing fraction being then subjected to said sieving with said screen of 20-50 mesh.

13. A process as set forth in claim 1, further comprising sieving said plus fraction using a screen of 5-20 mesh to separate said plus fraction into the husks and a protein-containing fraction.

14. A process for producing a protein-rich product and a fibrous product from brewer's spent grain containing germ, husks and a proteinaceous material adhering to the husks, said process comprising:

providing a wet brewer's spent grain having a water content of at least 65% by weight;

passing said wet brewer's spent grain through a roll mill to press and grind said brewer's spent grain with simultaneous grinding of the germ and the proteinaceous material, thereby separating said germ and proteinaceous material from said husks; and sieving the brewer's spent grain after passage through the roll mill, using a 5-20 mesh screen, to obtain a protein-rich fraction, containing the germ and proteinaceous material, as a minus fraction and the husks as a plus fraction;

sieving said protein-rich fraction into a coarse fraction and a fine fraction, using a 20-50 mesh screen, said fine fraction containing at least 50% protein;

recovering said fine fraction as a protein-rich product;

extracting said coarse fraction with a 0.05 N-0.15 N alkaline aqueous solution at a temperature of 60°-100° C. for a period of time of 10-40 minutes to obtain an extract;

acidifying said extract to form a precipitate; and separating and recovering said precipitate as protein-rich product.

15. A process as set forth in claim 14, wherein said acidifying comprises adding an acid to said extract immediately after the extraction to adjust the pH thereof to 7-10 and to obtain a solid-containing mixture, separating the solids from said mixture, adding an acid to the solid-free mixture to adjust the pH thereof to 2-5 to thereby precipitate protein and recovering said protein as a product.

16. A process as set forth in claim 15, which additionally comprises extracting said precipitated protein with a solvent, to thereby separate said precipitated protein into a defatted protein and a vegetable oil.

17. A process as set forth in claim 14 wherein said plus fraction has a particle size of 1-5 mm.

18. A process as set forth in claim 14 wherein said sieving utilizes a screen of 10-15 mesh.

19. A process as set forth in claim 14 wherein said roll mill has a roll gap of 0.05 to 2.0 mm.

* * * * *

UNITED STATES PATENT AND TRADEMARK OFFICE
CERTIFICATE OF CORRECTION

PATENT NO. : 5,135,765

DATED : August 4, 1992

INVENTOR(S) : KISHI et al

It is certified that error appears in the above-identified patent and that said Letters Patent is hereby corrected as shown below:

On the title page, item [30]:
    Under the heading "Foreign Application Priority Data" insert --Oct. 31, 1989 [JP] Japan............ 1-284,229--.

Col. 1, line 57, before "heat" insert --amount of--.

Col. 2, after line 28, begin a new paragraph and insert --These processes are described in detail below--;

line 32, delete entire line;

line 65, delete "with a structure suitable for giv-";

line 66, delete "ing a" and insert --which presses--.

UNITED STATES PATENT AND TRADEMARK OFFICE
CERTIFICATE OF CORRECTION

PATENT NO.   : 5,135,765
DATED        : August 4, 1992
INVENTOR(S)  : KISHI et al It is certified that error appears in the above-identified patent and that said Letters Patent is hereby corrected as shown below:

Col. 3, line 6, after "suffices" insert --for--;

line 31, after "to" insert --a--.

Col. 4, line 14, delete "recorder" insert --recover--; and line 61, after "verted" insert --to--.

Col. 5, line 30, delete "produce" and insert --product--.

Col. 6, line 6, delete "fraction" insert --sieved--;

line 8, delete "sieve" and insert --fraction--;

UNITED STATES PATENT AND TRADEMARK OFFICE
CERTIFICATE OF CORRECTION

PATENT NO. : 5,135,765

DATED : August 4, 1992

INVENTOR(S) : KISHI et al

It is certified that error appears in the above-identified patent and that said Letters Patent is hereby corrected as shown below:

Col. 6, line 24, delete "85%" and insert --85°C--.

Signed and Sealed this

Thirtieth Day of November, 1993

*Attest:*

BRUCE LEHMAN

*Attesting Officer*     Commissioner of Patents and Trademarks